(12) United States Patent
Sugishima (10) Patent No.: US 7,573,793 B2
(45) Date of Patent: Aug. 11, 2009

(54) POWER DETERMINING METHOD IN OPTICAL DISK RECORDING APPARATUS HAVING A PLURALITY OF PICKUPS

(75) Inventor: Akihiro Sugishima, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 671 days.

(21) Appl. No.: 11/238,865

(22) Filed: Sep. 29, 2005

(65) Prior Publication Data

US 2006/0077824 A1    Apr. 13, 2006

(30) Foreign Application Priority Data

Sep. 30, 2004    (JP)    ............... 2004-286196

(51) Int. Cl.
 *G11B 7/12*    (2006.01)
(52) U.S. Cl. .................... 369/47.53; 369/116
(58) Field of Classification Search .............. 369/47.53, 369/47.5, 47.51, 47.52, 47.54
 See application file for complete search history.

(56) References Cited

U.S. PATENT DOCUMENTS 5,295,126 A * 3/1994 Okano et al. ............. 369/47.54

7,158,457 B2 * 1/2007 Fukumoto ................ 369/47.53

FOREIGN PATENT DOCUMENTS

| JP | 8-102069 A | 4/1996 |
| JP | 9-212866 A | 8/1997 |
| JP | 3059334 | 3/1999 |

* cited by examiner

*Primary Examiner*—Hoa T Nguyen
*Assistant Examiner*—Mark Fischer
(74) *Attorney, Agent, or Firm*—Rossi, Kimms & McDowell, LLP (57) ABSTRACT

A method is designed for determining optimum power values of optical beams emitted from a plurality of optical pickups provided in an optical disk recording apparatus. In the method, a first step is performed for performing test recording of data by use of the plurality of the optical pickups, respectively, such that each optical pickup is operated to irradiate an optical beam onto the optical disk for recording data on a test area of the optical disk. A second step is performed for reproducing respective data recorded in the test area by the respective optical pickups, by use of a predetermined one of the plurality of the optical pickups. A third step is performed for judging β values from the respective data reproduced from the test area. A fourth step is performed for determining, from the judged β values, the optimum power values of the optical beams for the respective optical pickups.

2 Claims, 9 Drawing Sheets

POWER DETERMINING METHOD IN OPTICAL DISK RECORDING APPARATUS HAVING A PLURALITY OF PICKUPS

BACKGROUND OF THE INVENTION

1. Technical Field

The present invention relates to a method of determining optimum laser power for recording data on an optical disk, in an optical disk recording apparatus having a plurality of pickups.

2. Background Art

When recording information on a recordable type optical disk such as a DVD, if irradiation energy of a laser beam given to a recording layer is too large or too small, the shape or edge of a formed record mark is subjected to distortion so that a recorded data reproduction characteristic is degraded. Therefore, at the time of data recording, the power of the laser beam needs to be set to a value suitable for writing. However, a laser diode that generates a laser beam has a nature that the wavelength changes depending on a temperature variation, and the output level change due to variation of recording speed is very large. Further, a sensitivity characteristic of a recording layer differs individually per optical disk so that it is not possible to handle all disks with the same writing characteristic. In order to solve this problem, use has conventionally been made of a technique of OPC (recording laser power optimization, Optimum Power Control). In this technique, a test-write area PCA (Power Calibration Area) for performing power calibration is provided on a disk, test writing of test data is once carried out in this test-write area at the time of data recording, a recording power that can achieve a sufficient data reproduction characteristic is derived based on a result of reading the test-written data, and then recording of actual data is performed.

As documents relating to the OPC for the disk, the following are present.

[Patent Document 1]
Unexamined Patent Publication No. Hei 9-212866
[Patent Document 2]
Unexamined Patent Publication No. Hei 8-102069
[Patent Document 3]
Utility Model No. 3059334

Some type of the optical disk recording apparatus is provided with a plurality of optical pickups. When recording or reproducing information on a recordable type optical disk such as a DVD, the plurality of the optical pickups can be operated concurrently or alternately to enhance performance of data recording and data reproducing. However, the conventional OPC of an optical disk recording apparatus having the plurality of pickups may not determine optimal values of laser powers for the respective pickups, because data reading characteristics are different in OPC among the plurality of the pickups. Thus, it is difficult to perform recording of data with the power values optimum for the respective pickups and to equalize β values of the written data over the whole of a disk without receiving an influence caused by a difference in writing characteristic and reading characteristic among the respective pickups.

SUMMARY OF THE INVENTION

It is an object of the invention to remove an influence caused by a difference in writing characteristic and reading characteristic among the respective pickups in the optical disk recording apparatus having two or more pickups, and to provide an improved method and apparatus that solves a problem caused by that influence.

In one aspect of the invention, a method is designed for determining optimum power values of optical beams emitted from a plurality of optical pickups provided in an optical disk recording apparatus. The inventive method comprises: a step of performing test recording of data by use of the plurality of the optical pickups, respectively, such that each optical pickup is operated to irradiate an optical beam onto the optical disk for recording data on a test area of the optical disk; a step of reproducing respective data recorded in the test area by the respective optical pickups, by use of a predetermined one of the plurality of the optical pickups; a step of judging β values from the respective data reproduced from the test area; and a step of determining, from the judged β values, the optimum power values of the optical beams for the respective optical pickups.

In another aspect of the invention, an apparatus having a plurality of optical pickups is provided for irradiating optical beams onto an optical disk for recording or reproducing of data. The inventive apparatus comprises: a section that performs test recording of data by use of the plurality of the optical pickups, respectively, such that each optical pickup is operated to irradiate an optical beam onto the optical disk for recording data on a test area of the optical disk; a section that reproduces respective data written in the test area by the respective optical pickups, by use of a predetermined one of the plurality of the optical pickups; a section that judges β values from the respective data reproduced from the test area; and a section that determines, from the judged β values, the optimum power values of the optical beams for the respective optical pickups.

According to the present invention, the inventive method and apparatus performs writing of test data by the use of write circuits of the respective pickups, reads all the test data by the use of one of the plurality of pickups, and determines optimum power values of the respective pickups on the basis of the read data. With this configuration, it is possible to perform writing of data with the power values optimum for the respective pickups and to equalize β values of the written data over the whole of a disk without receiving an influence caused by a difference in writing characteristic and reading characteristic among the respective pickups.

DETAILED DESCRIPTION OF THE INVENTION

Figure 5:
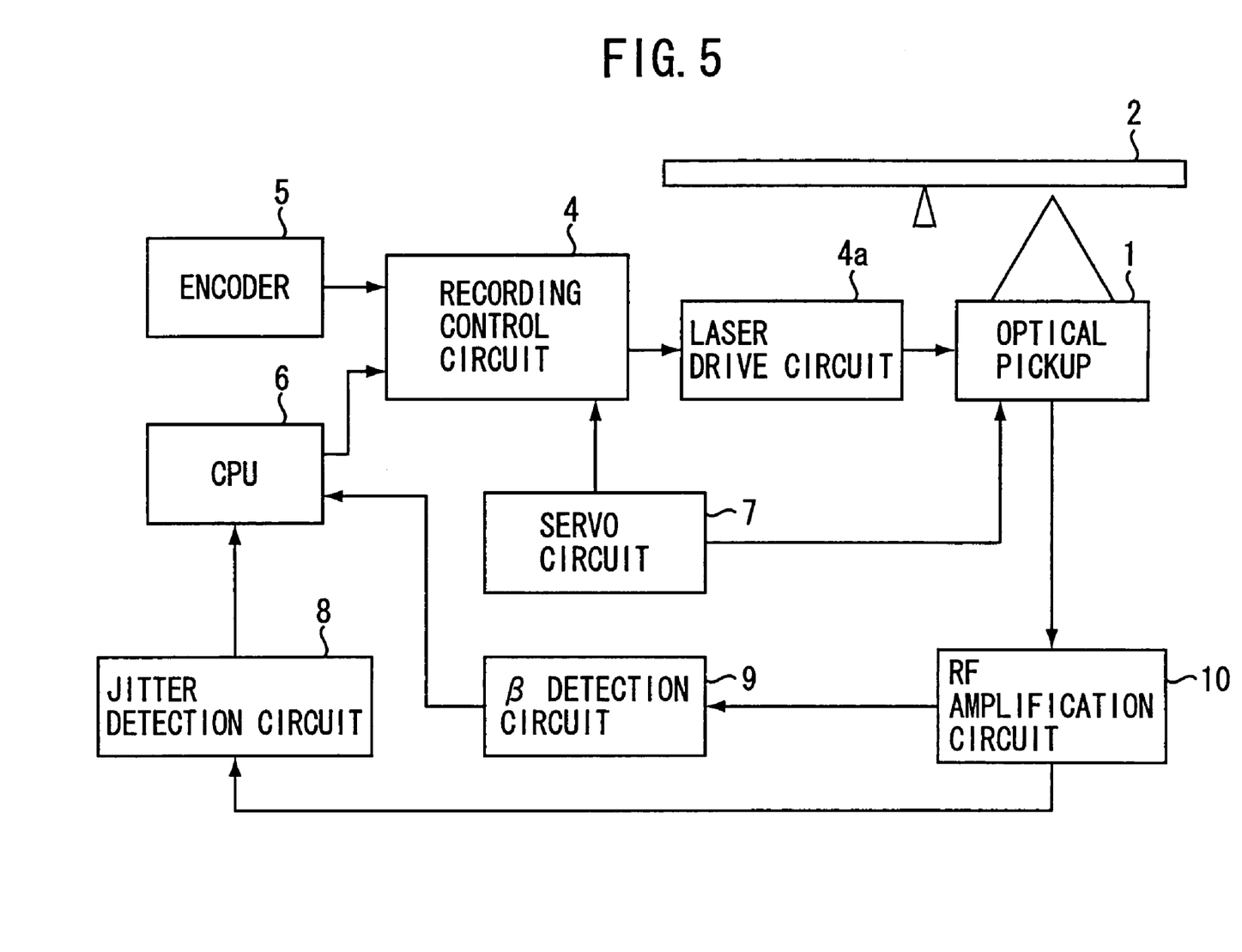
FIG. 5 is a structural diagram of an optical disk recording apparatus having a single pickup.

FIG. 5 shows a structure of an optical disk recording apparatus that performs recording/reproduction by the use of a single pickup. An encoder 5 converts record object information into an EFM (Eight to Fourteen Modulation) signal and outputs it to a recording control circuit 4. The recording control circuit 4 receives the EFM signal from the encoder 5, a control signal from a CPU 6, and a control signal from a servo circuit 7, and outputs a drive control signal to a laser drive circuit 3. On the basis of the drive control signal from the recording control circuit 4, the laser drive circuit 3 supplies the power to a laser diode in an optical pickup 1 so as to cause it to emit an optical beam such as a laser beam to an optical disk 2. The servo circuit 7 controls the position of the optical pickup 1.

Figure 6:
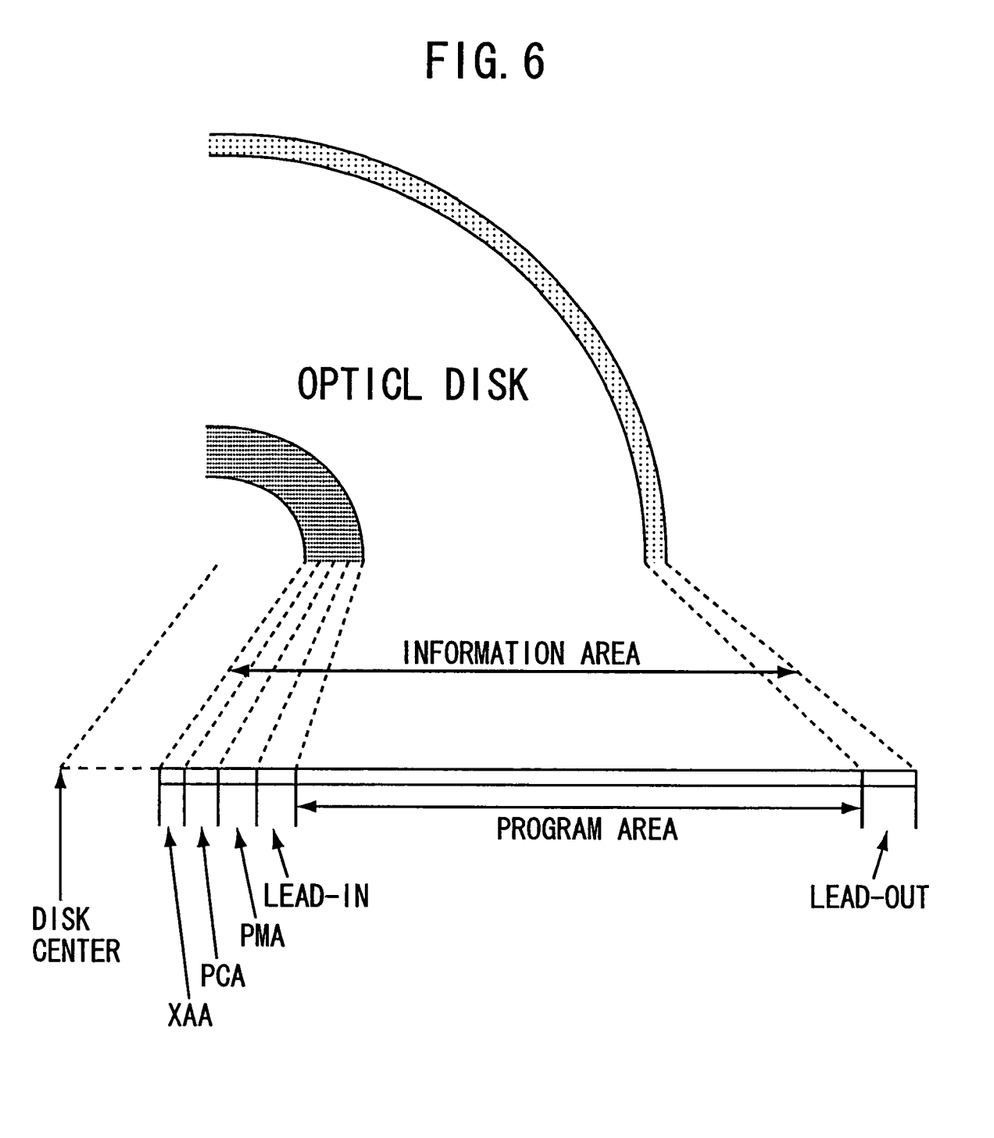
FIG. 6 is a diagram showing areas of an optical disk.

An RF amplification circuit 10 amplifies reflected light from the optical disk 1 received by the optical pickup 1 at the time of reproducing operation, and outputs an RF signal to a jitter detection circuit 8 and a β detection circuit 9. The β detection circuit 9 measures peak values, i.e. a maximum value A and a minimum value B, of the inputted RF signal, calculates (A+B)/(A−B), and outputs a calculation result to the CPU 6 as a β value. The CPU 6 derives an optimum laser power based on an input from the jitter detection circuit 8 and the foregoing β value, and outputs it to the recording control circuit 4. FIG. 6 shows an example of a physical format of a recordable type optical disk. In an information recording area of the optical disk, there are formed, from the inner peripheral side, an XAA (extended ATIP Area), a PCA (Power Calibration Area), a PMA (Program Memory Area), a lead-in area, a program area, and a lead-out area in the order named.

In the XAA, there is recorded additional information such as, for example, coloring matter information of a recording layer, a disk maker ID having manufactured the subject optical disk, and an initial value of recording power.

Figure 7A:
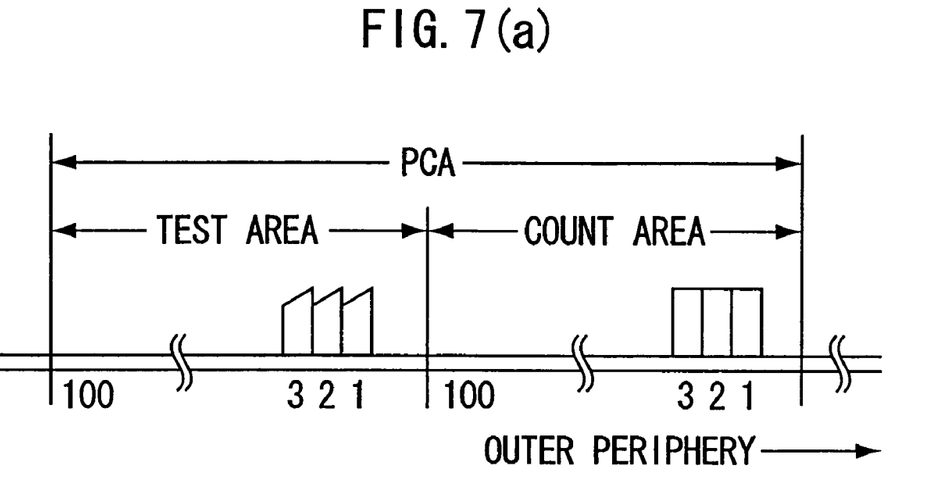
FIGS. 7(a) and 7(b) are diagrams showing PCA.

The PCA is a test-write area for performing power calibration and is an area where test data is test-written for adjusting recording power of a laser beam. Details of the PCA are shown in FIG. 7(a). The PCA is composed of a test area and a count area. The test area is an area where test data is written, while the count area is an area for identifying partitions (areas) that have been used for test writing in the test area. In the figure, 100 partitions are set in the PCA.

The PMA is an area for temporarily recording address information that is required at the time of data addition.

The lead-in area and the lead-out area are areas for recording TOC (Table of Contents), and the program area is an area for recording actual data. As described above, the PCA is provided on the disk inner peripheral side of the recordable optical disk. On the other hand, there is also a recordable optical disk that has a PCA also on the disk outer peripheral side.

Figure 7B:
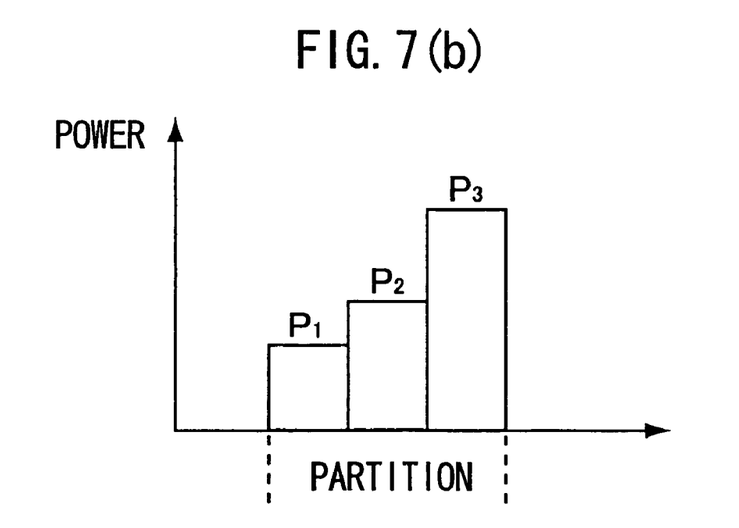

The OPC is executed before recording actual data, or after the lapse of a predetermined time from the start of recording. When the OPC is started, the CPU 6 in the optical disk recording/reproducing apparatus sets an initial value of laser power to P1. The CPU 6 moves the optical pickup to the test area of the PCA, selects one unused area from the test area shown in FIG. 7(a), and determines this area as a test-write area. The CPU 6 divides the selected area into three frames, for example, as shown in FIG. 7(b) and executes writing in the first frame with a first laser power P1. Thereafter, the CPU 6 executes writing in the second frame and then the third frame by changing the laser power in turn. The example shown in FIG. 7(b) is an example where the first frame is written with the minimum laser power P1, and the laser power is increased stepwise from the second frame to the third frame so that the third frame is written with the maximum laser power P3.

After the writing has been finished with respect to all the frames, written information is reproduced, maximum values A and minimum values B of reproduced RF signals are derived, and β values are calculated for the respective frames according to the calculation formula of (A+B)/(A−B). In each disk, a β value optimum for the disk (e.g. β0) is written in advance. This optimum value is read from the disk, a laser power that causes a β value as a result of writing to be β0 is derived based on the foregoing measured three β values, and a voltage to be applied to the laser diode for outputting the derived laser power is determined.

Figure 8A:
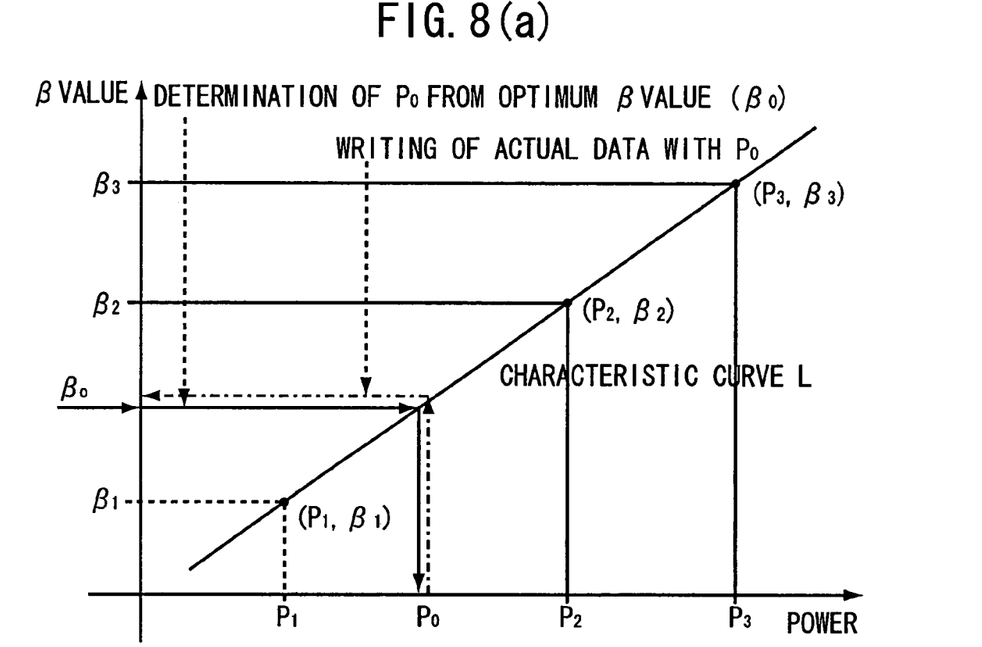
FIGS. 8(a) and 8(b) are characteristic diagrams of writing/reading in the PCA.

FIG. 8(a) shows a relationship between a laser power and a β value. In the figure, the sequence for determining an optimum power value is as follows.

(1) Writing test data into the respective frames of the test area while increasing the laser power in the order of $P_1$, $P_2$, and $P_3$.

(2) After completion of the writing, reproducing the data from the respective frames and calculating β values, $β_1$, $β_2$, and $β_3$, of the respective frames from waveforms of the reproduced data.

(3) Estimating a characteristic curve "L" from measurement points $(P_1, β_1)$, $(P_2, β_2)$, and $(P_3, β_3)$ shown by black circle dots ● in FIG. 8(a) by the use of means such as interpolation.

(4) Reading an optimum β value (β0) recorded in the disk.

(5) Deriving a laser power Po that causes a β value of writing to be β0, from β0 and the foregoing characteristic curve "L".

When actual data is written with the laser power Po derived by the foregoing sequence, a β value of the written data becomes β0 being the optimum β value of the disk so that an excellent reading characteristic can be obtained.

Figure 2A:
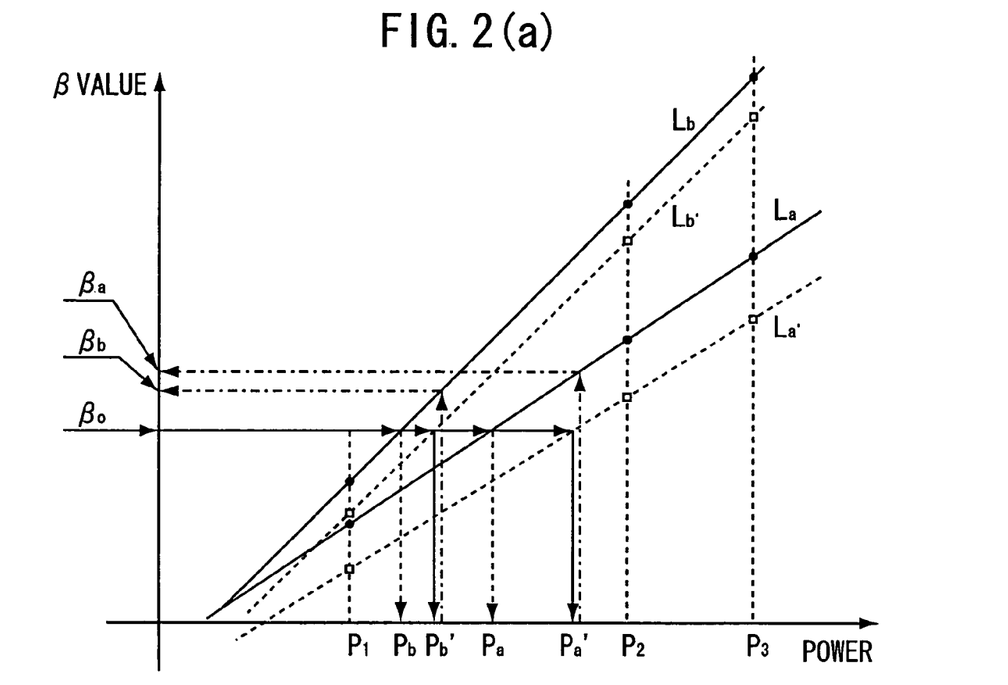
FIGS. 2(a) and 2(b) are characteristic diagrams of writing/reading by the plurality of pickups.
Figure 8B:
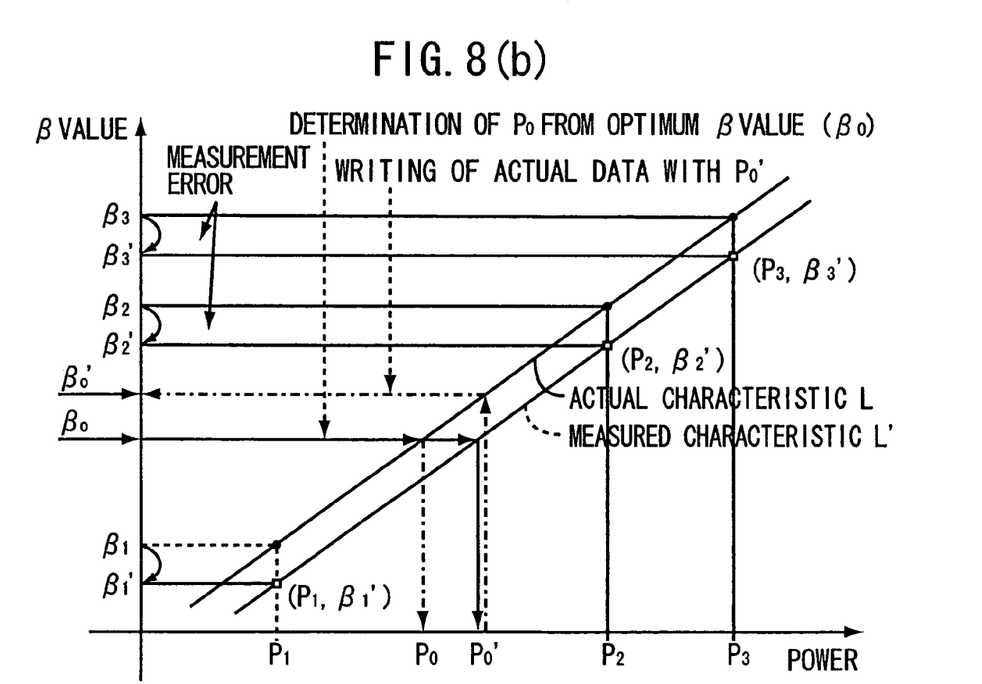

A diagram shown in FIG. 2(a) is described assuming that the read circuit of the disk apparatus carries out an ideal operation and there is no error existing in the read result. However, there exists production variation in properties of the laser element, the amplification circuit, or the like forming the write circuit of the disk apparatus and, further, the properties thereof also vary depending on a change in use environment such as temperature rise. Therefore, the result of reading the test data written by the test recording in the OPC includes an error caused by the properties of the read circuit. Accordingly, the measurement error also exists in the β values calculated based on the read result including the error. This state is shown in FIG. 8(b).

The error is included in the data which is read by the read circuit having the error from the respective frames of the test area where the writing was performed with the laser power $P_1$, $P_2$, and $P_3$. β values calculated based on the read result having the error become, for example, $β_1'$, $β_2'$, and $β_3'$ and thus take the values that differ from primary $β_1$, $β_2$, and $β_3$. Therefore, a characteristic curve estimated from measurement points $(P_1, β_1')$, $(P_2, β_2')$, and $(P_3, β_3')$ indicated by square dots □ in FIG. 8(b) becomes "L'" which differs from a primary characteristic curve "L". Since an optimum power value for obtaining β0 being the optimum β value of the disk is judged based on the characteristic curve "L'" according to the measured values, it is judged to be Po'. Writing of actual data is implemented using this laser power value Po'. Since the writing characteristic follows the actual characteristic curve "L", an actual β value at the time of the writing with the laser power Po' becomes β0' and thus takes the value which differs from β0. The difference between β0' and β0 is based on the error of the read circuit and thus varies dependently on a change in reading characteristic caused by a difference in read circuit or a change in temperature.

Figure 1A:
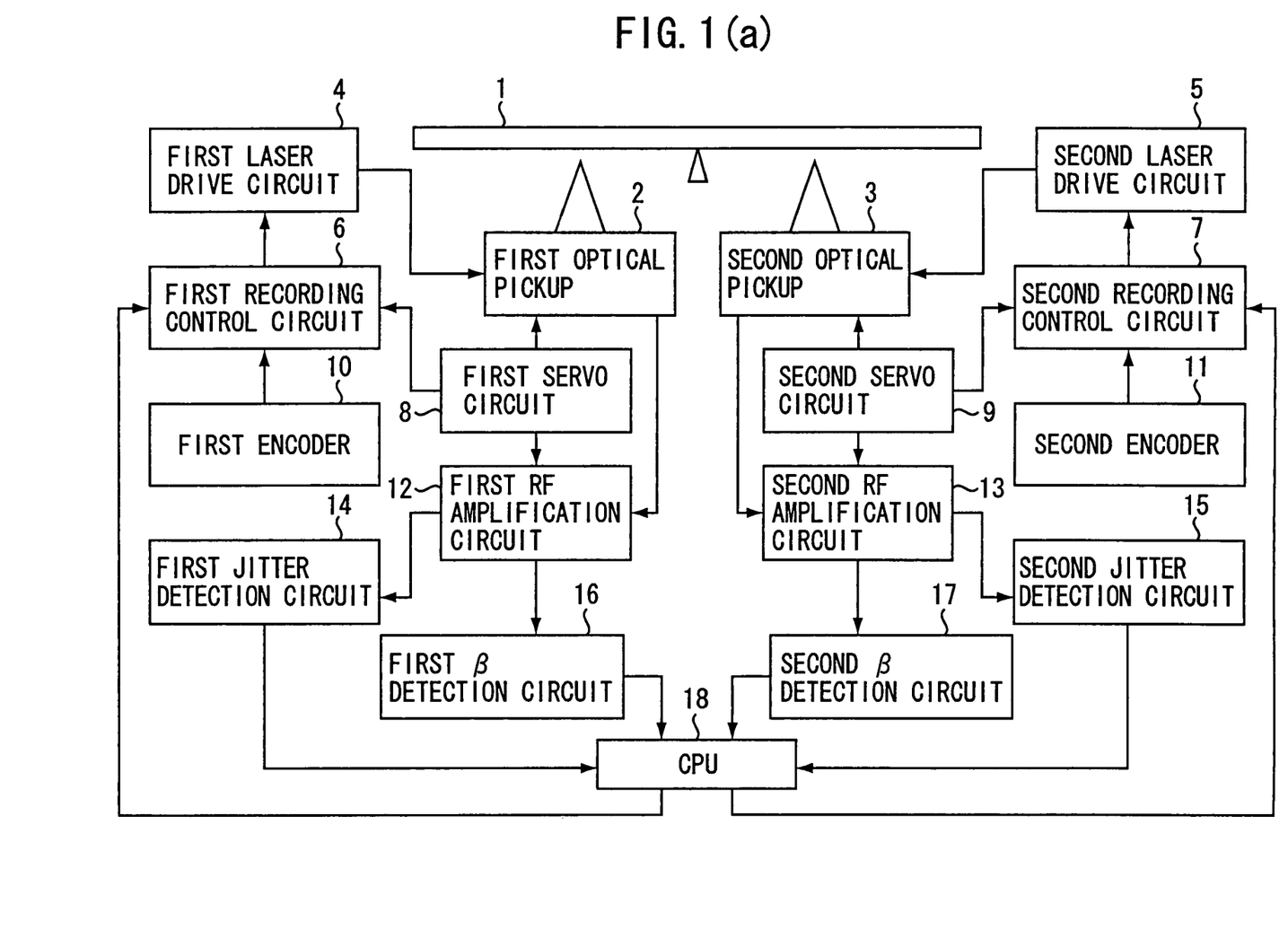
FIGS. 1(a) and 1(b) are a schematic diagram of an optical disk recording apparatus having a plurality of pickups, which is applied with the present invention.

FIG. 1(a) shows a structure of an optical disk recording apparatus having two pickups, i.e. the first pickup and the second pickup. A first pickup portion and a second pickup portion in the figure comprise, like the pickup of the optical disk recording apparatus shown in FIG. 5, optical pickups 2 and 3, laser drive circuits 4 and 4a, recording control circuits 6 and 7, servo circuits 8 and 9, RF amplification circuits 12 and 13, β detection circuits 16 and 17, jitter detection circuits 14 and 15, and encoders 10 and 11, respectively, and are commonly controlled by a CPU 18. Laser properties and circuit temperature properties of the pickup 2 and the pickup 3 are not the same as each other. When the ambient temperature around the pickups changes, a difference is caused between wavelengths of respective lasers due to a difference in temperature between the pickups so that laser spot diameters of the respective pickups, each proportional to wavelength/NA, also change.

As a result, recording sensitivities of the pickups 2 and 3 change with respect to an optical disk so that the optimum recording laser power of the respective pickups takes different values. Therefore, if the plurality of pickups perform recording with the same laser output, recorded data exhibit different β values due to the difference between the pickups that performed the recording. Inequality of the β values on the surface of the optical disk causes occurrence of a read error. In order to solve this problem, it is necessary to execute the OPC with respect to the respective pickups of the optical disk recording apparatus independently of each other to thereby derive an optimum laser power value per pickup.

However, as described with reference to FIG. 8(b), the read circuit of the pickup generates the read error and the β values calculated on the basis of the read result including the error take values that differ from the primary values. Further, the properties of the read circuits have variation and the developing manner of the foregoing read error depends on the reading characteristic of the individual pickup so that the developing manner of the read error differs per pickup. Therefore, even if the disk apparatus having the plurality of pickups implements the OPC for each pickup to thereby determine a power value that achieves the optimum β value (β0), a read and calculated β value differs therefrom due to the difference in properties of the read circuit of each pickup so that it is impossible to achieve the same β value over the whole surface of the optical disk.

Figure 1B:
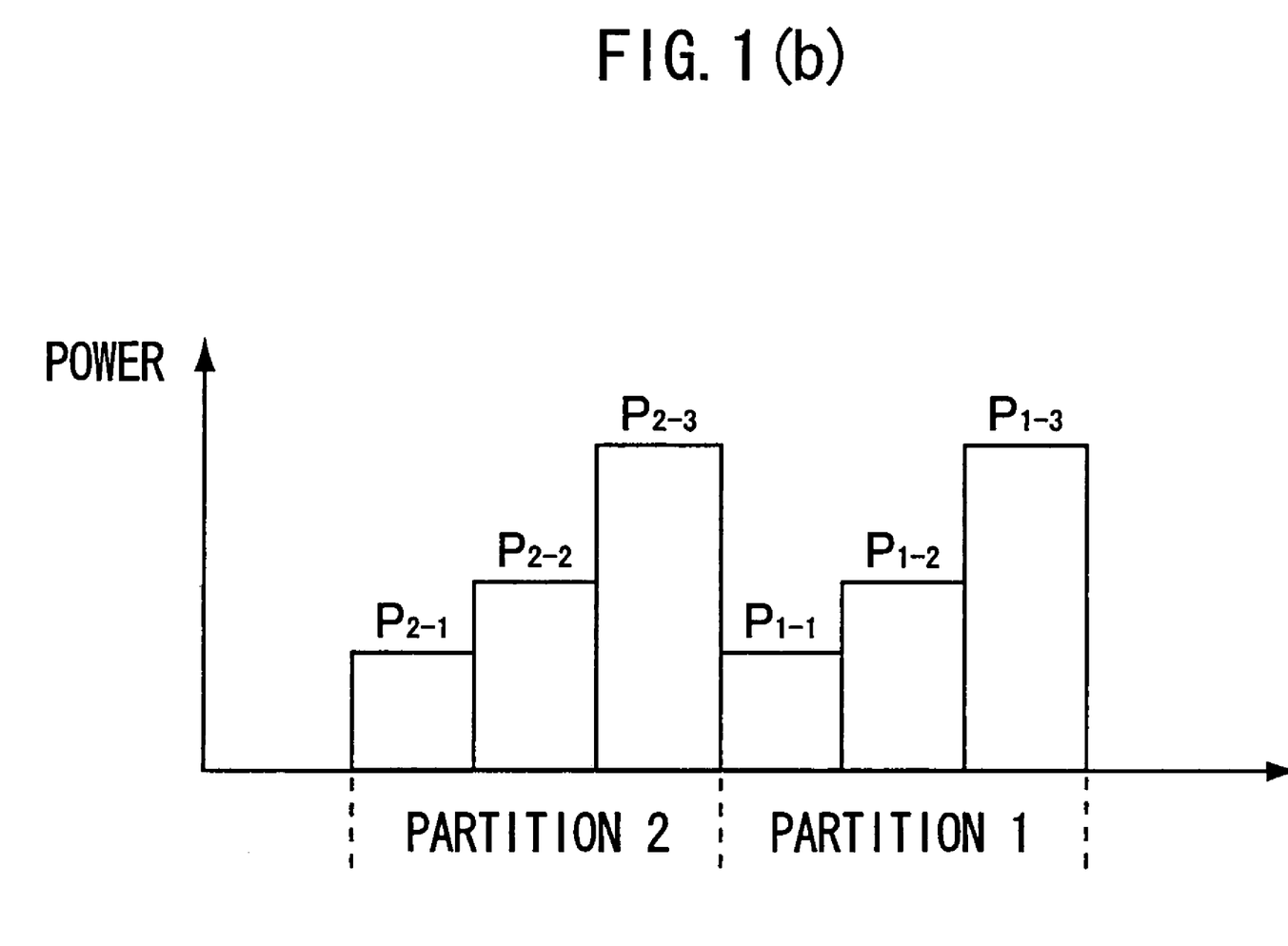
Figure 2B:
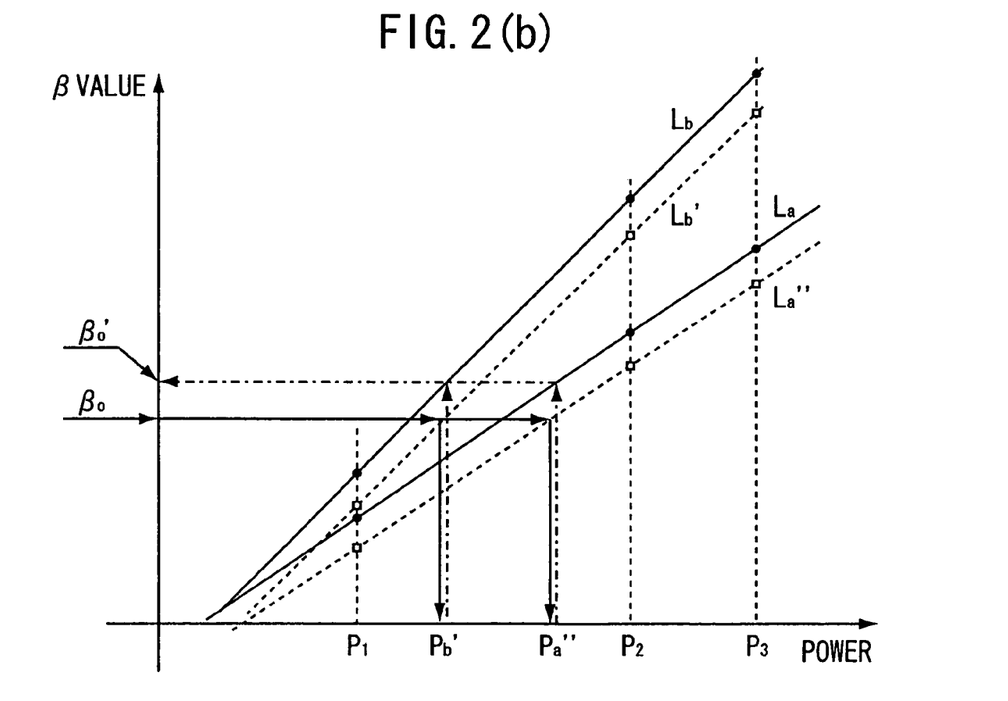

FIG. 2 shows, in the optical disk recording apparatus having the two pickups, an influence caused by a difference in writing characteristic and reading characteristic between the respective pickups, and an operation of a structure of the present invention that solves a problem caused by that influence. FIG. 1(b) shows a change in laser power of the OPC using the two pickups. A partition 1 is an OPC area for the first pickup while another partition 2 is an OPC area for the second pickup, and an operation performed in each area is the same as the conventional operation shown in FIGS. 7 and 8.

FIG. 2(a) shows actual characteristic curves and characteristic curves based on measured values, of the first and second pickups. "$L_a$" and "$L_a'$" are the actual characteristic curve and the characteristic curve based on the measured values, of the first pickup, while, "$L_b$" and "$L_b'$" are the actual characteristic curve and the characteristic curve based on the measured values, of the second pickup. "$L_a$" and "$L_a'$", and "$L_b$" and "$L_b'$" correspond to "L" and "L'" of FIG. 8(b), respectively. Since the write circuits of the first pickup and the second pickup have different writing characteristics, the first characteristic curve "$L_a$" and the second characteristic curve "$L_b$" become different from each other. Further, the first pickup and the second pickup also differ in reading characteristics of the read circuits and the developing manner of the error also differs from each other. As a result, a position relationship between "$L_a$" and "$L_a'$" and a position relationship between "$L_b$" and "$L_b'$" differ from each other. FIG. 2(a) shows an example where the read error of the first pickup is greater than the read error of the second pickup.

When deriving, from β0 being the optimum β value of the disk, power values for achieving β0 on the basis of the characteristics of FIG. 2(a), the power value is judged to be $P_a'$ for the first pickup, which should be $P_a$, while, the power value is judged to be $P_b'$ for the second pick up, which should be $P_b$. At the time of writing actual data, the first pickup performs the writing with $P_a'$ and the second pickup performs the writing with $P_b'$. As a result, a β value of the actual data by the first pickup becomes $β_a$ while a β value of the actual data by the second pickup becomes $β_b$ so that the β values written on the same disk surface are not uniform, which causes a read error or the like at the time of reading. The present invention solves the foregoing problem and has a structure where recording into respective test areas in the OPC is performed by the respective pickups while reading of test data written in the respective test areas is performed by only a predetermined one of the plurality of pickups, and calculation of β values is performed based on measured values read by such one pickup.

The present invention provides a method for solving the foregoing problem, wherein writing of a test pattern into test-write areas is carried out by the write circuits of the respective pickups while reading of the test pattern written in the respective test-write areas is carried out by a predetermined particular one of the plurality of pickups. Then, it is configured such that β values of the respective data are calculated from the data read by such one pickup to thereby judge characteristic curves of the respective pickups.

FIG. 2(b) shows an operation of the present invention. The writing and reading characteristics of the two pickups in the figure are the same as those shown in FIG. 2(a), while, reading of the test data written in the respective test areas of the OPC is implemented by the second pickup. Therefore, "$L_a$", "$L_b$", and "$L_b'$" in FIG. 2(b) are the same as "$L_a$", "$L_b$", and "$L_b'$" in FIG. 2(a). Test data written into the first test area by the first pickup is read by the second pickup. Therefore, a characteristic of a read error immanent in the test data read from the first test area is the same as a characteristic of a read error immanent in test data read from the second test area by the second pickup. Accordingly, a relationship between the actual characteristic curve "$L_a$" and a characteristic curve "$L_a''$" estimated on the basis of measured values read by the second pickup, of the first pickup becomes the same as the relationship between the writing characteristic "$L_b$" and the characteristic curve "$L_b'$" based on the measured values read by the second pickup, of the second pickup.

When judging, from β0 being the optimum β value of the disk, power values for achieving β0 on the basis of FIG. 2(b), the power value is judged to be Pb' for the second pickup like in FIG. 2(a), while, the power value is judged to be Pa" for the first pick up so that writing of actual data by the first pickup is implemented with the laser power value Pa". Since the relationship between "$L_a$" and "$L_a''$" is the same as the relationship between "$L_b$" and "$L_b'$", a β value of the writing with the power value Pa" and a β value of writing of actual data with the laser power value Pb' by the second pickup both become β0', i.e. become the same value. As a result, even when data is written on a disk by the use of a plurality of pickups, it becomes possible to write the data with the same β value, i.e. β0', over the whole surface of the disk.

Figure 3:
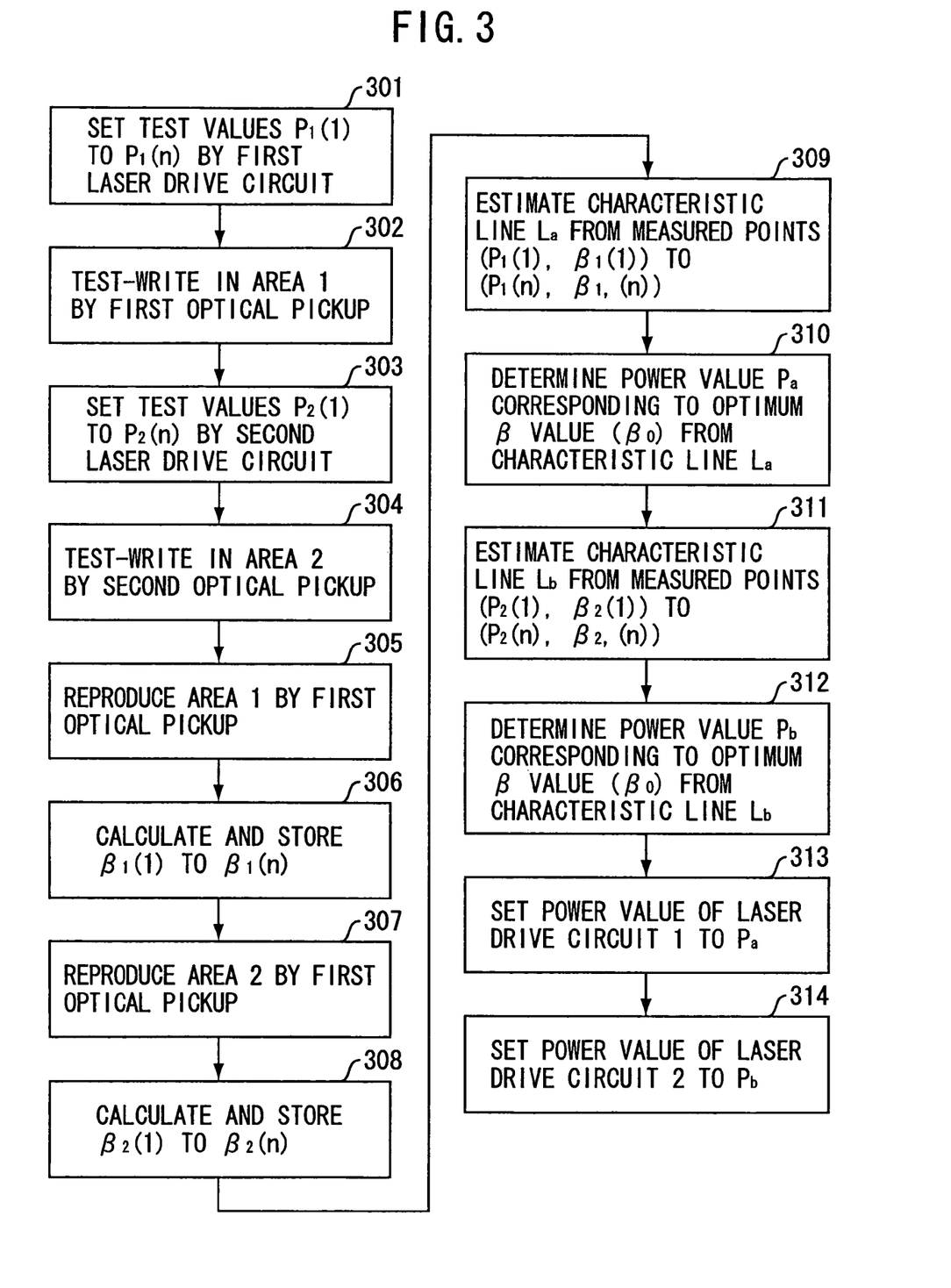
FIG. 3 is a flow diagram of an embodiment of the present invention.

FIG. 3 shows the flow of the OPC in the optical disk recording apparatus having the two pickups.

Step 301: In order to perform test writing in respective frames of the test-write area with laser powers $P_{1-1}$ to $P_{1-n}$, the CPU 19 sets power values $P_{1-1}$ to $P_{1-n}$ in the first laser drive circuit. In the example shown in FIGS. 1(*b*) and 2, n is set to 3.

Step 302: Move the first optical pickup to the test-write area 1 in the PCA and perform test writing in the area 1 with the foregoing power values $P_{1-1}$ to $P_{1-n}$.

Step 303: Like in step 301, set power values $P_{2-1}$ to $P_{2-n}$ for testing in the second laser drive circuit. In the example shown in FIGS. 1(*b*) and 2, $P_{2-1}$ to $P_{2-n}$ are set to the same values as $P_{1-1}$ to $P_{1-n}$.

Step 304: Like in step 302, perform test writing in the area 2 by the use of the second pickup.

Step 305: Read a test pattern written in the area 1 by the use of the first optical pickup.

Step 306: Calculate (A+B)/(A−B) from maximum values A and minimum values B of RF signals lead-in step 305 and store obtained results as $\beta_{1-1}$ to $\beta_{1-n}$.

Step 307: Like in step 305, read the area 2 by the use of the first optical pickup.

Step 308: Like in step 306, calculate $\beta_{2-1}$ to $\beta_{2-n}$ from RF signals lead-in step 307.

Step 309: Determine respective measured points ($P_{1-1}$, $\beta_{1-1}$) to ($P_{1-n}$, $\beta_{1-n}$) and perform interpolation between the respective points to thereby estimate a characteristic curve $L_a$.

Step 310: Determine a power value $P_a$ corresponding to the optimum β value (β0) of the disk from the characteristic curve $L_a$.

Step 311: Determine respective measured points ($P_{2-1}$, $\beta_{2-1}$) to ($P_{2-n}$, $\beta_{2-n}$) and perform interpolation between the respective points to thereby estimate a characteristic curve $L_b$.

Step 312: Determine a power value $P_b$ corresponding to the optimum β value (β0) of the disk from the characteristic curve $L_b$.

Step 313: Set a power value of the first optical pickup laser drive circuit to $P_a$.

Step 314: Set a power value of the second optical pickup laser drive circuit to $P_b$.

Figure 4:
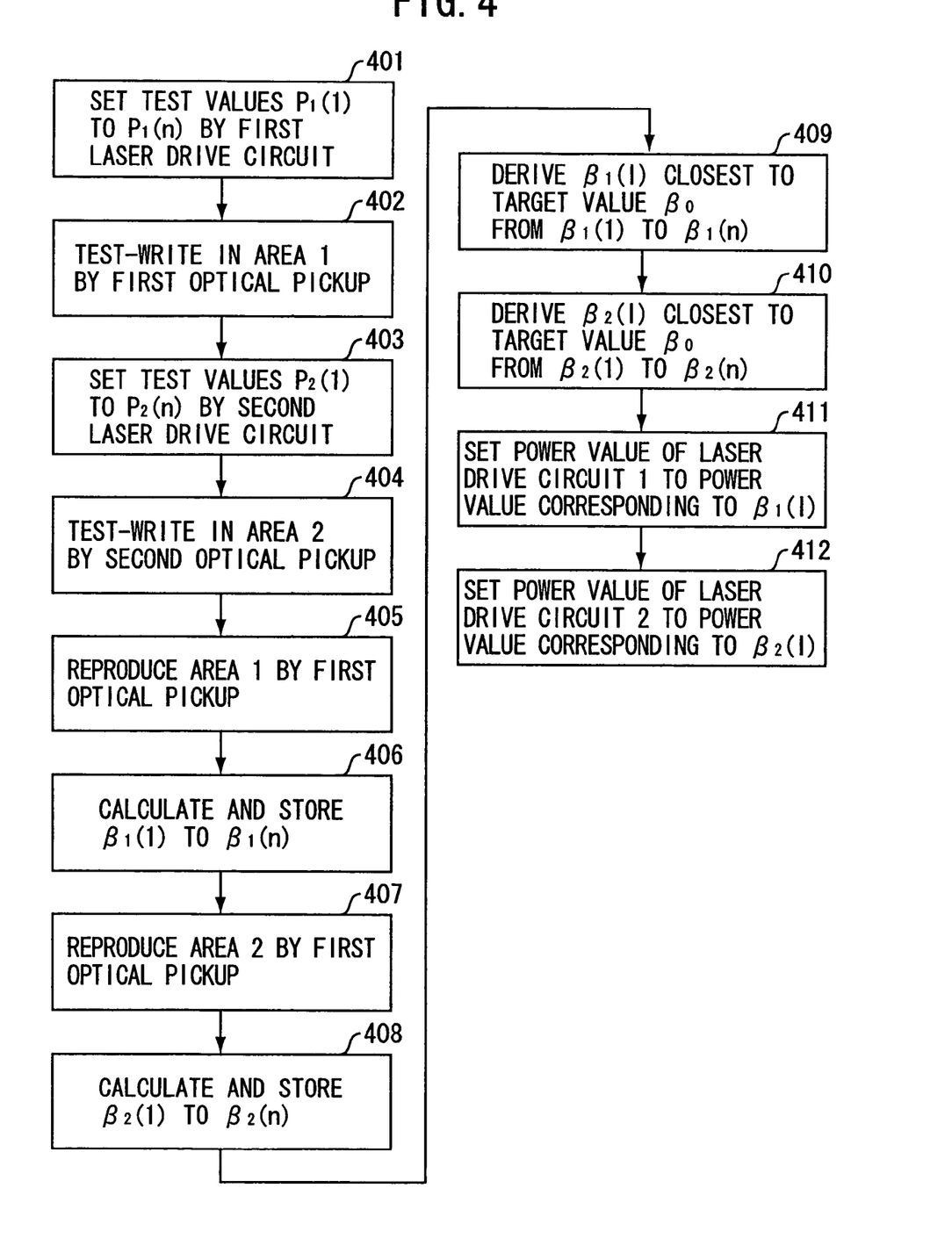
FIG. 4 is a flow diagram of another embodiment of the present invention.

The embodiment shown in FIGS. 1 to 3 is configured such that the number of frames dividing one test area is set to, for example, three and each of the characteristic curves "$L_a$'", "$L_b$'", etc. is estimated from three measured points by performing interpolation such as linear approximation. However, by increasing the number of frames dividing one test area so as to sufficiently reduce a change between adjacent power values that are used for test writing, it is possible to regard as an optimum value a measured β value that is closest to the optimum β value among β values calculated from read data and set as an optimum power value a power value that has achieved such a β value. FIG. 4 explains this configuration.

In this example, one test area is divided into n frames and a test pattern is written into the first to n frames with laser powers that change (e.g. increase) sequentially.

Step 401: Select one unused test area for the first pickup from an OPC area on a disk and divide this test area (area 1) into n frames. Then, set test power values $P_{1-1}$ to $P_{1-n}$ that are used for writing into the respective divided frames and store these test power values.

Step 402: Drive the first optical pickup with the test power values $P_{1-i}$ to $P_{1-n}$ in turn, and perform test writing into the n frames of the area 1 in turn.

Step 403: Select one unused test area for the second pickup from the OPC area on the disk and divide this test area (area 2) into n frames. Then, set test power values $P_{2-1}$ to $P_{2-n}$ that are used for writing into the respective divided frames and store these test power values.

Step 404: Drive the second optical pickup with the test power values $P_{2-1}$ to $P_{2-n}$ in turn and perform test writing into the n frames of the area 2 in turn.

Step 405: Reproduce the n frames of the area 1 in turn by the use of the first optical pickup.

Step 406: Measure peak values, i.e. maximum values A and minimum values B, of RF signals read and reproduced from the respective frames, calculate (A+B)/(A−B), respectively, and store calculated results as $\beta_{1-1}$ to $\beta_{1-n}$.

Step 407: Reproduce the n frames of the area 2 in turn by the use of the first optical pickup.

Step 408: Measure peak values, i.e. maximum values A and minimum values B, of RF signals read and reproduced from the respective frames, calculate (A+B)/(A−B), respectively, and store calculated results as $\beta_{2-1}$ to $\beta_{2-n}$.

Step 409: Derive $\beta_{1-I}$ closest to the target value β0 from $\beta_{1-1}$ to $\beta_{1-n}$.

Step 410: Derive $\beta_{2-I}$ closest to the target value β0 from $\beta_{2-1}$ to $\beta_{2-n}$.

Step 411: Derive the power value $P_{1-I}$ corresponding to $\beta_{1-I}$ from the set values set in step 401 and set $P_{1-I}$ in the laser drive circuit 1.

Step 412: Derive the power value $P_{2-I}$ corresponding to $\beta_{2-I}$ from the set values set in step 403 and set $P_{2-I}$ in the laser drive circuit 2.

What is claimed is:

1. A method of determining optimum power values of optical beams emitted from at least first and second optical pickups provided in an optical disk recording apparatus, the method comprising the steps of:

performing test recording of test data with each of the first and second optical pickups such that each of the first and second optical pickups is operated to irradiate an optical beam onto an optical disk for recording the test data on a respective test area of the optical disk;

reproducing with one of the first or second optical pickup, the test data recorded in the respective test areas with the first and second optical pickups;

judging β values from the test data reproduced with the one optical pickup from the test areas of the optical disk that were recorded using the first and second optical pickup; and determining, from the judged β values, the optimum power values of the optical beams for each of the first and second optical pickups.

2. An apparatus having at least first and second optical pickups for irradiating optical beams onto an optical disk for recording or reproducing data, the apparatus comprising:

a section that performs test recording of test data with the first and second optical pickup, such that each of the first and second optical pickups is operated to irradiate an optical beam onto the optical disk for recording the test data on a respective test area of the optical disk;

a section that reproduces with one of the first or second optical pickup, the test data written in the respective test areas with the first and second optical pickups;

a section that judges β values from the test data reproduced with the one optical pickup from the test areas of the optical disk that were written using the first and second optical pickups; and a section that determines, from the judged β values, optimum power values of the optical beams for each of the first and second optical pickups.

* * * * *